(12) United States Patent
Murata et al.

(10) Patent No.: US 11,008,663 B2
(45) Date of Patent: May 18, 2021

(54) ELECTROLYSIS SYSTEM

(71) Applicant: KABUSHIKI KAISHA TOYOTA CHUO KENKYUSHO, Nagakute (JP)

(72) Inventors: Hajime Murata, Nagakute (JP); Kiyoshi Yamazaki, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 285 days.

(21) Appl. No.: 16/170,511

(22) Filed: Oct. 25, 2018

(65) Prior Publication Data
US 2019/0161874 A1 May 30, 2019

(30) Foreign Application Priority Data

Nov. 30, 2017 (JP) .............................. JP2017-230925
May 24, 2018 (JP) .............................. JP2018-099466

(51) Int. Cl.
*C25B 15/02* (2021.01)
*C25B 1/04* (2021.01)
*C25B 9/19* (2021.01)
*C25B 9/65* (2021.01)
*C25B 9/73* (2021.01)

(52) U.S. Cl.
CPC ................ *C25B 15/02* (2013.01); *C25B 1/04* (2013.01); *C25B 9/19* (2021.01); *C25B 9/65* (2021.01); *C25B 9/73* (2021.01)

(58) Field of Classification Search
CPC ........ C25B 15/02; C25B 9/04; C25B 1/02–12
See application file for complete search history.

(56) References Cited

U.S. PATENT DOCUMENTS

2017/0088958 A1* 3/2017 Koeneman .............. C25B 15/08

FOREIGN PATENT DOCUMENTS

| JP | S62-182294 A | 8/1987 |
|---|---|---|
| JP | H06-260201 A | 9/1994 |
| JP | H10-330978 A | 12/1998 |
| JP | 2006-073501 A | 3/2006 |
| JP | 2006-236741 A | 9/2006 |
| JP | 2008-075097 A | 4/2008 |
| JP | 2017/149606 A | 8/2017 |
| WO | 2017/149606 A1 | 9/2017 |

OTHER PUBLICATIONS

Jun. 30, 2020 Japanese Office Action issued in Japanese Patent Application No. 2018-099466.

* cited by examiner

*Primary Examiner* — Nicholas A Smith
(74) *Attorney, Agent, or Firm* — Oliff PLC

(57) ABSTRACT

The electrolysis system of the present invention has a water electrolysis unit equipped with a water electrolysis cell using a solid polymer electrolyte membrane as its diaphragm, a DC power source for supplying the water electrolysis cell with a DC current, and a mitigation unit for mitigating, when a counter electromotive force or abrupt potential fluctuation occurs in the water electrolysis cell, the counter electromotive force or the potential fluctuation. The mitigation unit is preferably a coil+diode (A) connected in parallel between the DC power source and the water electrolysis cell or a diode (B) connected between the DC power source and the water electrolysis cell. The electrolysis system is preferably equipped further with a lowering rate controller for controlling the lowering rate of a current supplied from the DC power source to the water electrolysis cell.

9 Claims, 13 Drawing Sheets

ONE-SIDE
WATER CIRCULATION TYPE

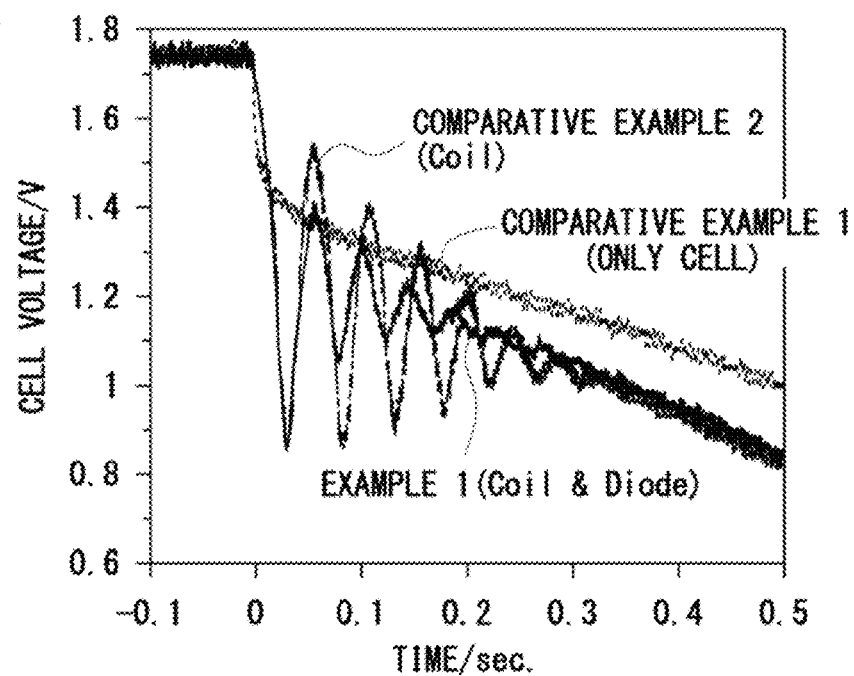
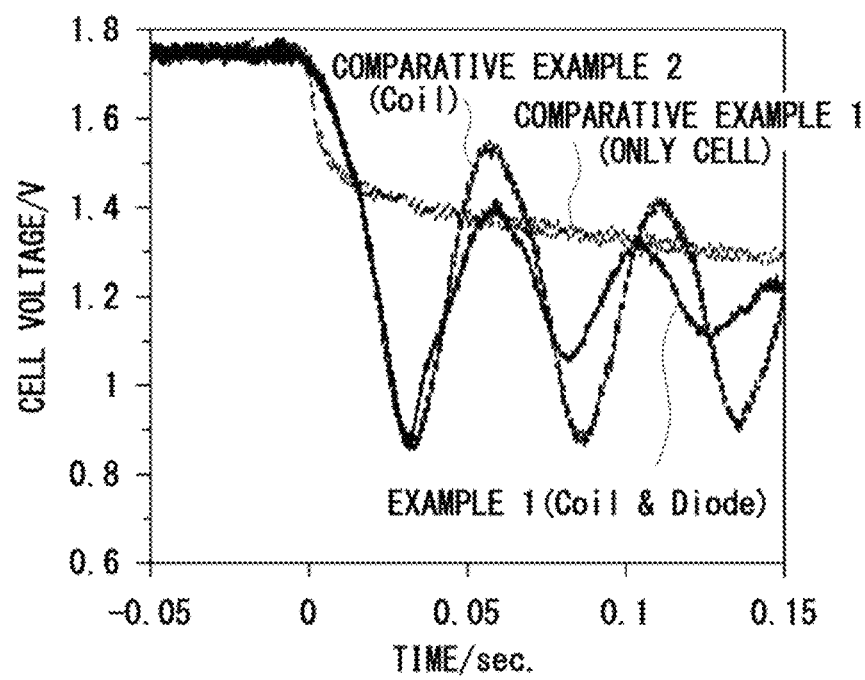

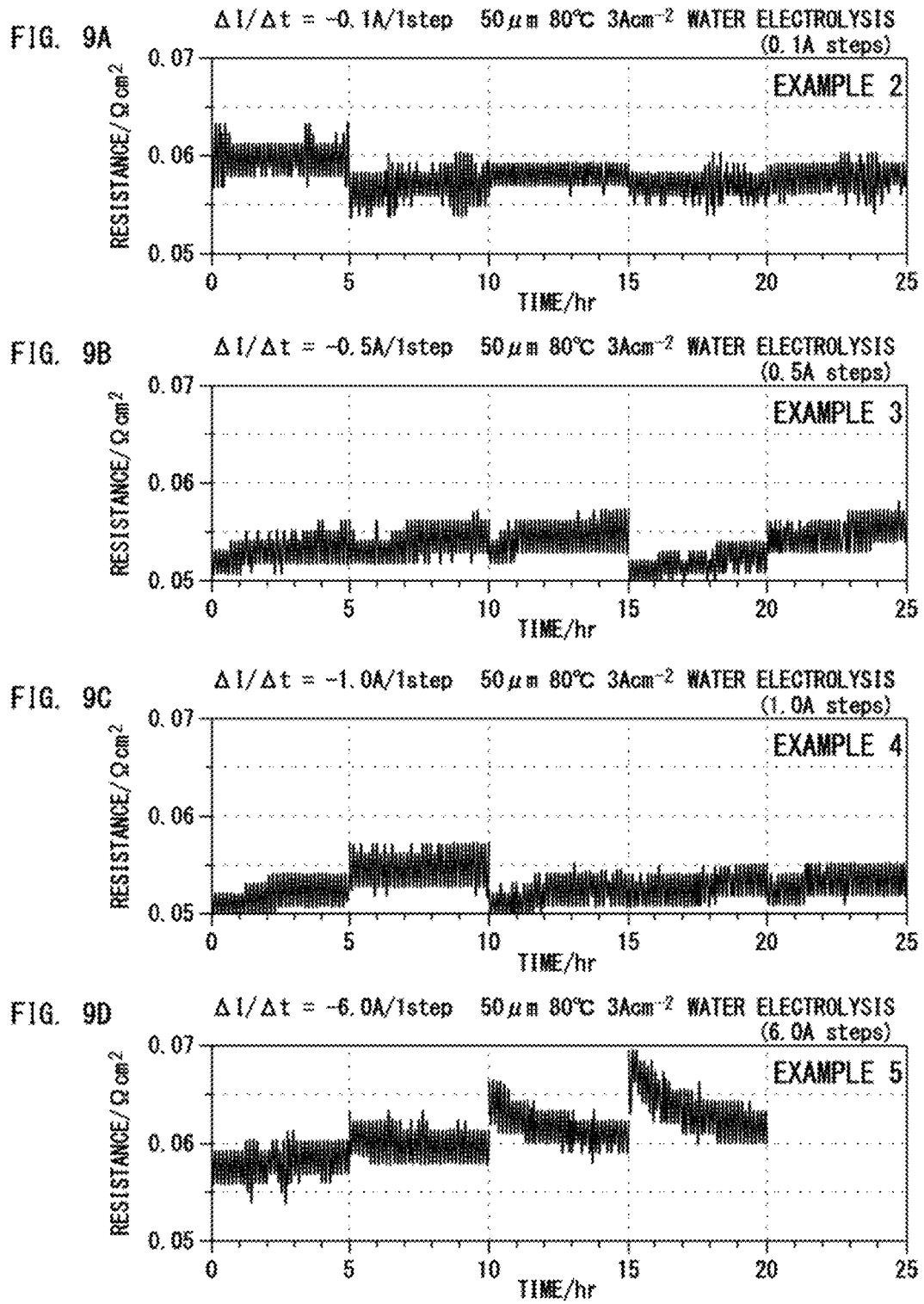

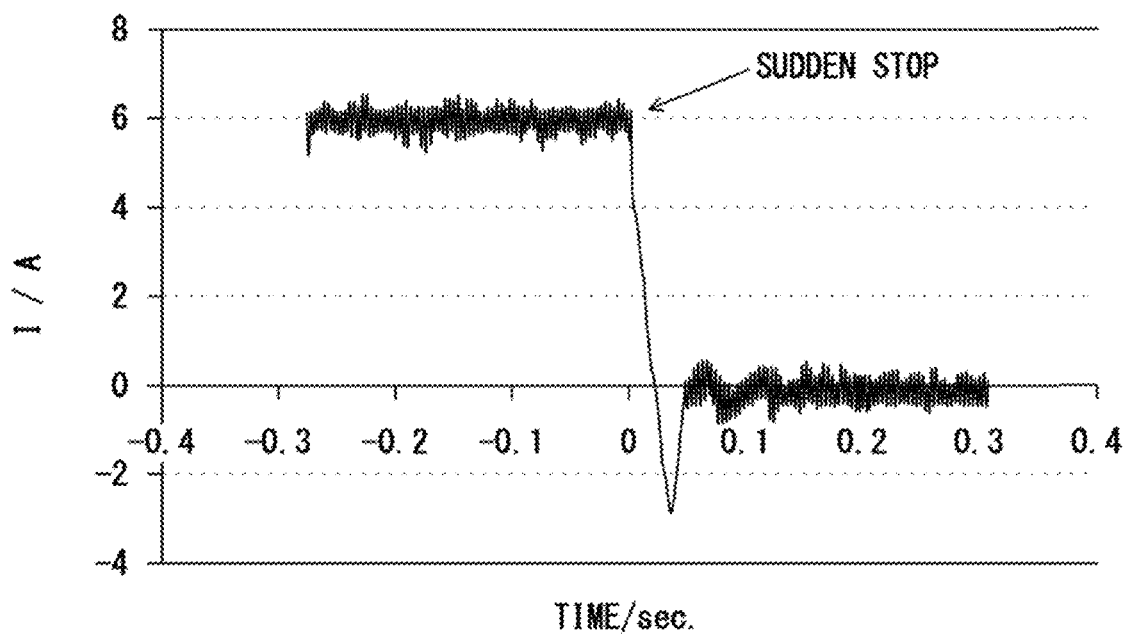
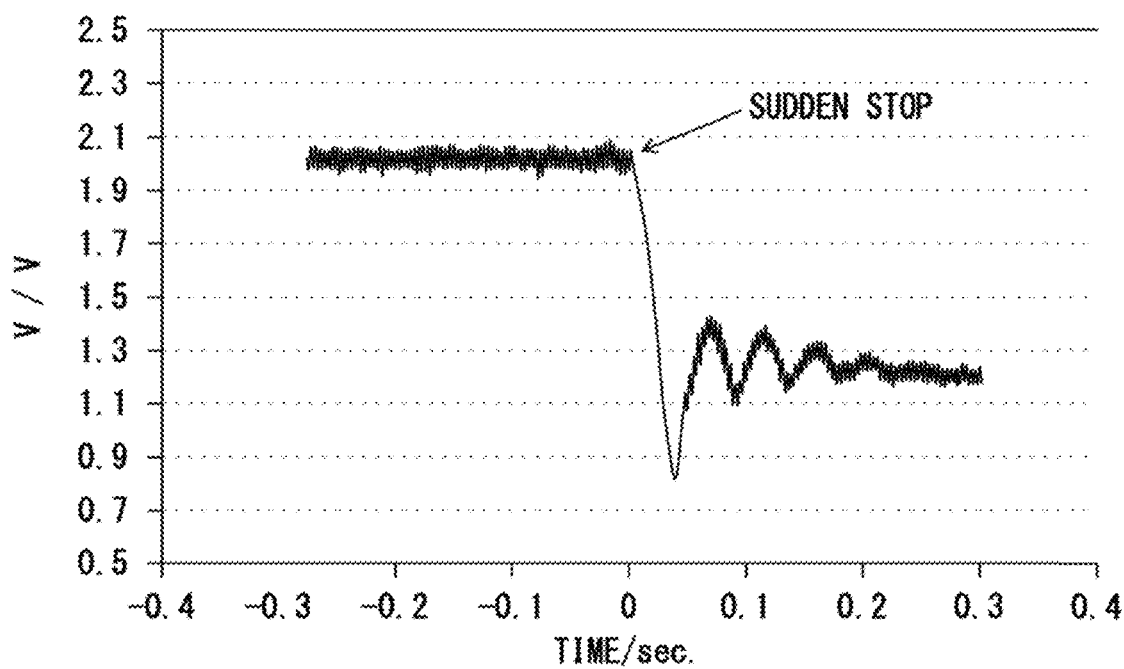

ELECTROLYSIS SYSTEM

FIELD OF THE INVENTION

The present invention relates to an electrolysis system. More specifically, it relates to an electrolysis system capable of suppressing deterioration of a water electrolysis cell due to fluctuation in input power.

BACKGROUND OF THE INVENTION

As a water electrolysis apparatus, a water electrolysis apparatus using a solid polymer electrolyte membrane as a diaphragm (Polymer Electrolyte Membrane (PEM) water electrolysis apparatus), a water electrolysis apparatus having an alkaline electrolyte solution separated by a partition, a high-temperature water electrolysis apparatus using a solid oxide as an electrolyte, and the like are known. Of these, the PEM water electrolysis apparatus has such advantages that it can generate hydrogen by using only water, a hydrogen gas does not contain an impurity other than water, and an operating temperature is low. The PEM water electrolysis apparatus, however, has the drawback that abrupt potential fluctuation in the water electrolysis cell reduces the life of the water electrolysis cell.

In order to overcome this problem, various proposals have been made conventionally.

For example, Patent Literature 1 discloses a fuel cell power generating system with water electrolysis apparatus that performs electrolysis by charging a secondary cell with DC electricity generated in a fuel cell and supplying the water electrolysis apparatus with the DC electricity sent from the secondary cell.

This document describes:

(A) the life of the water electrolysis apparatus is shortened by continuing the input of DC electricity from the fuel cell to the water electrolysis apparatus, because power transmission from the fuel cell is often in the state of intense voltage fluctuation at the initial stage of the start of the fuel cell or during preparation operation for stop;

(B) once the secondary cell is charged with DC electricity generated in the fuel cell, unstable electric energy from the fuel cell is converted into stable electric energy; and (C) deterioration of the water electrolysis apparatus is suppressed because DC electricity sent to the water electrolysis apparatus from the secondary cell has almost no voltage fluctuation.

Patent Literature 2 discloses a power generating system equipped with:

a power generation unit comprised of a wind and/or solar power generator, a storage cell for storing therein power obtained by the power generation unit, a water electrolysis apparatus for performing therein water electrolysis by using the power obtained by the power generation unit, a hydrogen reservoir unit for storing therein hydrogen generated in the water electrolysis apparatus, a fuel cell for obtaining power by using hydrogen generated in the water electrolysis apparatus or hydrogen stored in the hydrogen reservoir, and a power control unit for controlling a supplier of power obtained by the power generation unit, power stored in the storage cell, and power obtained by the fuel cell.

This document describes that such a power generation system makes it possible to store natural energy as power of a storage cell and at the same time, store natural energy efficiently by storing hydrogen generated by electrolysis as a power source of the fuel cell.

Potential fluctuation in power supplied to a water electrolysis apparatus accelerates deterioration of a water electrolysis cell. This is presumably because reduction of an oxygen electrode catalyst caused by the potential fluctuation is likely to accelerate the elution of the catalyst.

In order to solve this problem, as disclosed in the Patent Literature 1 and 2, it is conceivable not to supply power directly to a water electrolysis apparatus from a power source that easily causes potential fluctuation but to store power from the power source once in a storage cell and then supply it from the storage cell to the water electrolysis apparatus. This method has, however, the problem that it requires installment of a storage cell and therefore the system becomes large.

Further, potential fluctuation that deteriorates an oxygen electrode catalyst may occur not only by potential fluctuation in an input power source but also by the repetition of start/stop. However, a method for suppressing deterioration of an oxygen electrode catalyst resulting from the repetition of start/stop has never been proposed conventionally.

CITATION LIST

Patent Literature

Patent Literature 1: Japanese Unexamined Patent Application Publication No. H06-260201
Patent Literature 2: Japanese Unexamined Patent Application Publication No. 2006-236741

SUMMARY OF THE INVENTION

An object of the present invention is to suppress, in an electrolysis system equipped with a PEM water electrolysis unit, deterioration of a water electrolysis cell resulting from fluctuation in input power.

An electrolysis system of the present invention proposed to achieve the above-described object has:

a water electrolysis unit equipped with a water electrolysis cell using a solid polymer electrolyte membrane as a diaphragm, a DC power source for supplying the water electrolysis cell with a DC current, and a mitigation unit for mitigating, when a counter electromotive force or abrupt potential fluctuation occurs in the water electrolysis cell, the counter electromotive force or the potential fluctuation.

The mitigation unit is preferably:

(a) a coil and a diode (A) connected in parallel between the DC power source and the water electrolysis cell, or (b) a diode (B) connected between the DC power source and the water electrolysis cell.

The electrolysis system preferably has a lowering rate controller for controlling a lowering rate of a current supplied from the DC power source to the water electrolysis cell.

When the oxygen electrode catalyst of the water electrolysis cell is exposed to a low potential, the surface of the oxygen electrode catalyst temporarily becomes reduced. The elution of the oxygen electrode catalyst progresses when the potential increases abruptly from such a state. Such elution of the oxygen electrode catalyst may occur in the case where a counter electromotive force occurs in the water electrolysis cell, potential fluctuation in input power occurs, or start/stop is repeated.

On the other hand, the electrolysis system equipped with a mitigation unit for mitigating a counter electromotive force or abrupt potential fluctuation can suppress elution of the oxygen electrode catalyst. The elution of the oxygen electrode catalyst is suppressed further when the electrolysis system is equipped further with the lowering rate controller.

BRIEF DESCRIPTION OF THE DRAWINGS

FIG. 7A is a time-dependent change of cell voltage before and after sudden stop of a current (from −0.1 second to +0.5 second) in an electrolysis system equipped with various circuits;

FIG. 7B is a partially enlarged view (from −0.05 second to +0.15 second) of FIG. 7A;

FIGS. 9A, 9B, 9C, and 9D are respective time-dependent changes of membrane resistance when a current is lowered at various lowering rates in an electrolysis system equipped with a mitigation unit;

FIG. 11A is a time-dependent current change when a current supplied from the DC power source is abruptly lowered from 6 A to zero A;

FIG. 11B is a time-dependent change of cell voltage when a current supplied from the DC power source is abruptly lowered from 6 A to zero A;

DETAILED DESCRIPTION OF THE PREFERRED EMBODIMENTS

One embodiment of the present invention will hereinafter be described in detail.

1. Electrolysis System (1)

Figure 1:
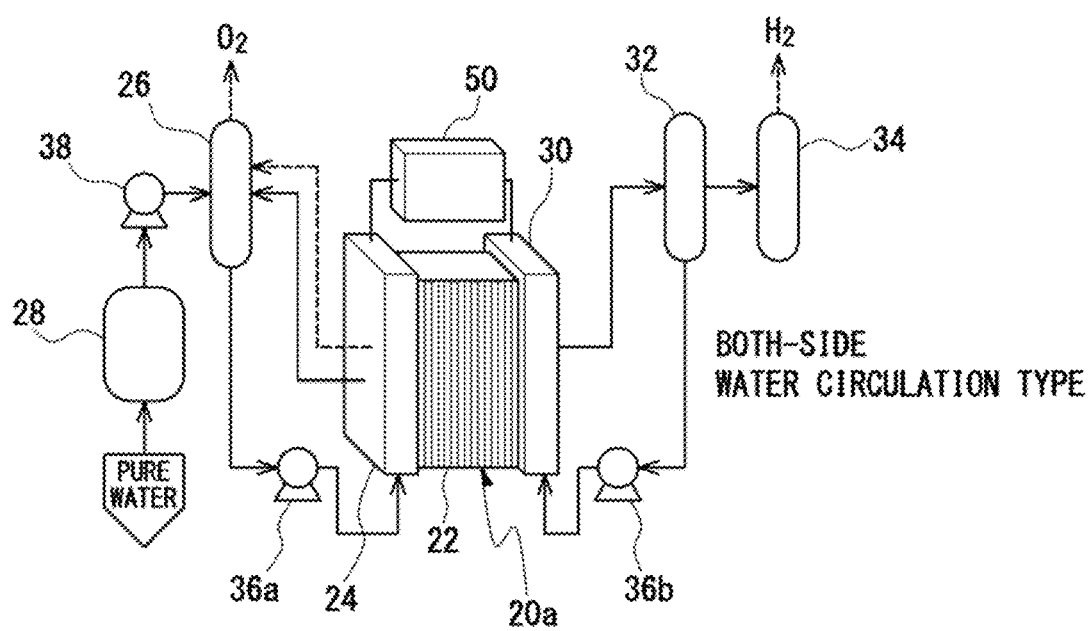
FIG. 1 is a schematic view of a both-side water circulation type electrolysis system.

FIG. 1 shows a schematic view of an electrolysis system of a first embodiment of the present invention. In FIG. 1, an electrolysis system 10a has:

a water electrolysis unit 20a equipped with a water electrolysis cell using a solid polymer electrolyte membrane as its diaphragm, a DC power source 50 for supplying the water electrolysis cell with a DC current, and a mitigation unit (not illustrated) for mitigating, when a counter electromotive force or abrupt potential fluctuation occurs in the water electrolysis cell, the counter electromotive force or the potential fluctuation.

1.1. Water Electrolysis Unit

In the invention, the structure of the water electrolysis unit 20a is not particularly limited. The water electrolysis unit 20a exemplified in FIG. 1 is a both-side water circulation type water electrolysis unit.

The water electrolysis unit 20a is equipped with a water electrolysis stack (or water electrolysis cell) 22, an oxygen electrode-side manifold 24, an oxygen electrode-side gas-liquid separator 26, a storage tank 28, a hydrogen electrode-side manifold 30, a hydrogen electrode-side gas-liquid separator 32, and a dehumidifier 34.

The water electrolysis stack 22 is comprised of the stack of a plurality of unit cells (water electrolysis cells), and the unit cell includes a membrane electrode assembly (MEA) having an electrode coupled to both surfaces of a solid polymer electrolyte membrane and a current collector placed on both sides of the MEA. In a small-scale electrolysis system, a unit cell (water electrolysis cell) may be used instead of the water electrolysis stack.

The water electrolysis stack 22 has, on the oxygen electrode-side thereof, the oxygen electrode-side manifold 24. The oxygen electrode-side manifold 24 delivers water, which has been supplied from the oxygen electrode-side gas-liquid separator 26, to each water electrolysis cell. The outlet of the oxygen electrode-side manifold 24 is connected to an inlet of the oxygen electrode-side gas-liquid separator 26 and the outlet of the oxygen electrode-side gas-liquid separator 26 is connected with the inlet of the oxygen electrode-side manifold 24 via a first circulation pump 36a.

The oxygen electrode-side gas-liquid separator 26 supplies water as a raw material of electrolysis to the oxygen electrode-side manifold 24 through the first circulation pump 36a and at the same time, collects oxygen-containing water generated at an oxygen electrode, and separates oxygen therefrom. The oxygen gas thus separated in the oxygen electrode-side gas-liquid separator 26 is typically discharged into the air.

With the other inlet of the oxygen electrode-side gas-liquid separator 26, the storage tank 28 is connected via a pump 38. Pure water supplied from the outside is stored temporarily in the storage tank 28. At the time of electrolysis, the oxygen electrode-side gas-liquid separator 26 is replenished with an adequate amount of pure water through the pump 38.

The water electrolysis stack 22 has, on the hydrogen electrode-side thereof, a hydrogen electrode-side manifold 30. The hydrogen electrode-side manifold 30 collects a hydrogen gas (and bonded water discharged to a hydrogen electrode-side due to proton conduction) discharged from the hydrogen electrode of each water electrolysis cell, and discharges it outside the water electrolysis stack 22.

In the present embodiment, the outlet of the hydrogen electrode-side manifold 30 is connected with the inlet of the hydrogen electrode-side gas-liquid separator 32 and an outlet of the hydrogen electrode-side gas-liquid separator 32 is connected with the inlet of the hydrogen electrode-side manifold 30 via a second circulation pump 36b. When water electrolysis is performed, it is not always necessary to circulate water to the hydrogen electrode-side but water electrolysis performed while circulating water can accelerate elimination of a hydrogen gas from the surface of the electrode.

With the other outlet of the hydrogen electrode-side gas-liquid separator 32, a dehumidifier 34 is connected. The dehumidifier 34 removes water as an impurity from the hydrogen gas discharged from the hydrogen electrode-side gas-liquid separator 32. The hydrogen gas from which water is removed by the dehumidifier 34 is supplied to various hydrogen consumption apparatuses (for example, fuel cell).

1.2. DC Power Source

The DC power source 50 supplies the water electrolysis unit 20a with power necessary for water electrolysis. The + electrode of the DC power source 50 is connected with the oxygen electrode-side current collector, while the − electrode is connected with a hydrogen electrode-side current collector. In the present invention, the kind of the DC power source 50 is not particularly limited.

The DC power source 50 may be either:

(a) a commercial power source or (b) a variable power source comprised of a solar power generator, a wind power generator, and/or a wave power generator. When the power source is an AC power source, a direct current is generated using an AC/DC converter.

1.3. Mitigation Unit

The "mitigation unit" is a device for mitigating, when a counter electromotive force or abrupt potential fluctuation occurs in the water electrolysis cell, the counter electromotive force or the potential fluctuation.

The term "abrupt potential fluctuation" means a cell voltage change rate ($=|\Delta V/\Delta t|$) of 0.1 V/msec or more.

The first factor of the deterioration of the water electrolysis cell is a counter electromotive force (backward current). The backward current has large influence on the deterioration of the water electrolysis cell. When a circuit has a coil component thereon, there occurs, at the time of a current decrease, a counter electromotive force having a magnitude proportional to the current decreasing rate and an inductance component of the coil. The backward current generated thereby accelerates deterioration of the water electrolysis cell. When the mitigation unit is used, on the other hand, the counter electromotive force can be decreased in principle, making it possible to suppress deterioration.

The second factor of the deterioration of the water electrolysis cell is abrupt potential fluctuation. In particular, when a potential is raised from a lower potential side to a high potential side (a current raising direction), a catalyst surface under a relatively reduced state (in other words, a catalyst surface under an easily eluted state) is exposed to a high potential and an elution speed of the catalyst increases. On the other hand, when the potential is raised slowly by using the mitigation unit, the oxidation of the catalyst surface is completed when the potential becomes high. The elution of the catalyst can therefore be suppressed.

The mitigation unit is not particularly limited insofar as it can mitigate such a counter electromotive force or potential fluctuation. Specific examples of the mitigation unit will be described below. These mitigation units may be used either singly or in combination as long as physically possible.

1.3.1. Coil+Diode (A)

Figure 2A:
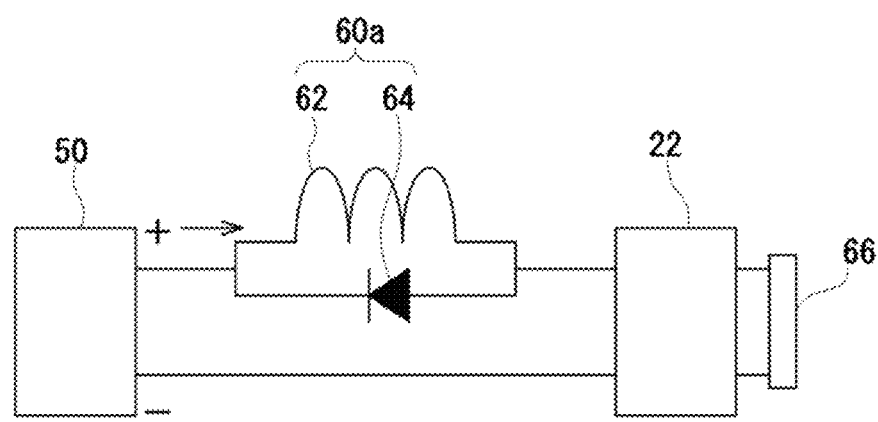
FIGS. 2A and 2B respectively show schematic views of an electrolysis system equipped with first and second specific examples of the mitigation unit.

FIG. 2A shows a schematic view of an electrolysis system equipped with a first specific example of the mitigation unit. In FIG. 2A, a mitigation unit 60a is equipped with a coil 62 connected between the DC power source 50 and the water electrolysis cell (or water electrolysis stack 22) and a diode (A) 64 connected in parallel with the coil 62. The diode (A) 64 is connected in parallel with the coil 62 such that a direction opposite to the current direction for electrolysis becomes a forward direction.

The coil 62 filters a high-frequency component coming from the DC power source 50 and hinders it from reaching the water electrolysis cell (or water electrolysis stack 22). Although the coil 62 has such a positive effect, it is a cause for generating a backward current when a current drops abruptly. Since the latter effect is larger, installment of only the coil 62 inevitably accelerates the deterioration of the water electrolysis cell (or water electrolysis stack 22).

The diode (A) 64 is therefore placed in parallel to the coil 62 and at the same time, placed in a direction opposite to the electrolytic current. The backward current, if generated, does not flow in the water electrolysis cell but consumed in the diode (A) 64. This can make apparent the latent positive effect of the coil 62. As a result, the influence of power fluctuation can be mitigated.

When the coil 62 and the diode (A) 64 are connected in parallel, an AC resistance meter 66 may be connected with the water electrolysis cell (or water electrolysis stack 22). Installation of the coil 62 enables connection of the AC resistance meter 66 with the water electrolysis cell and is therefore advantageous. In addition, installment of the AC resistance meter 66 enables diagnosis of the condition of the water electrolysis cell.

When the coil 62 is not installed, an AC current also flows to the side of the DC power source 50 even if the AC resistance meter 66 is connected so that pure information of the water electrolysis cell cannot be obtained. When the circuit shown in FIG. 2A is used, an AC current component does not flow to the side of the DC power source 50. Only the information of the water electrolysis cell can therefore be obtained.

1.3.2. Diode (B)

Figure 2B:
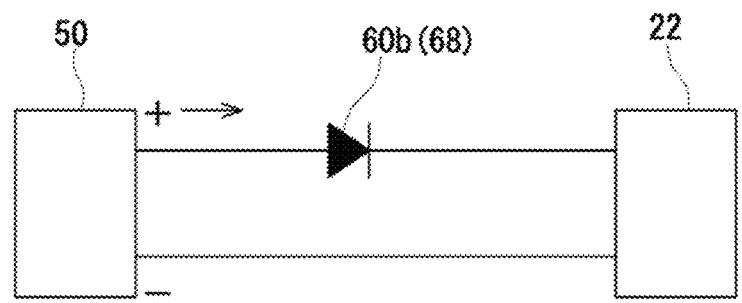

FIG. 2B shows the schematic view of an electrolysis system equipped with the second specific example of the mitigation unit. In FIG. 2B, the mitigation unit 60b is equipped with a diode (B) 68 connected between the DC power source 50 and the water electrolysis cell (or water electrolysis stack 22). The diode (B) 68 is connected between the DC power source 50 and the water electrolysis cell (or water electrolysis stack 22) such that the current direction for electrolysis becomes a forward direction.

When neither the AC resistance meter 66 nor the coil 62 is equipped, only insertion of the diode (B) 68 in the circuit is effective for suppressing a backward current. In addition to the diode (B) 68, a coil 62 and the diode (A) 64 may be connected in series with the side near the DC power source 50.

1.4. Application

In general, with an increase in the current density at the time of electrolysis, the water electrolysis cell is more likely to undergo larger potential fluctuation. On the other hand, the electrolysis system of the present invention is equipped with the mitigation unit so that deterioration of the water electrolysis cell is suppressed even if electrolysis is performed at a high current density. The electrolysis system of the present invention is preferably used particularly for applications in which electrolysis is performed at a current density as high as 1.5 A/cm$^2$ or more.

2. Electrolysis System (2)

Figure 3:
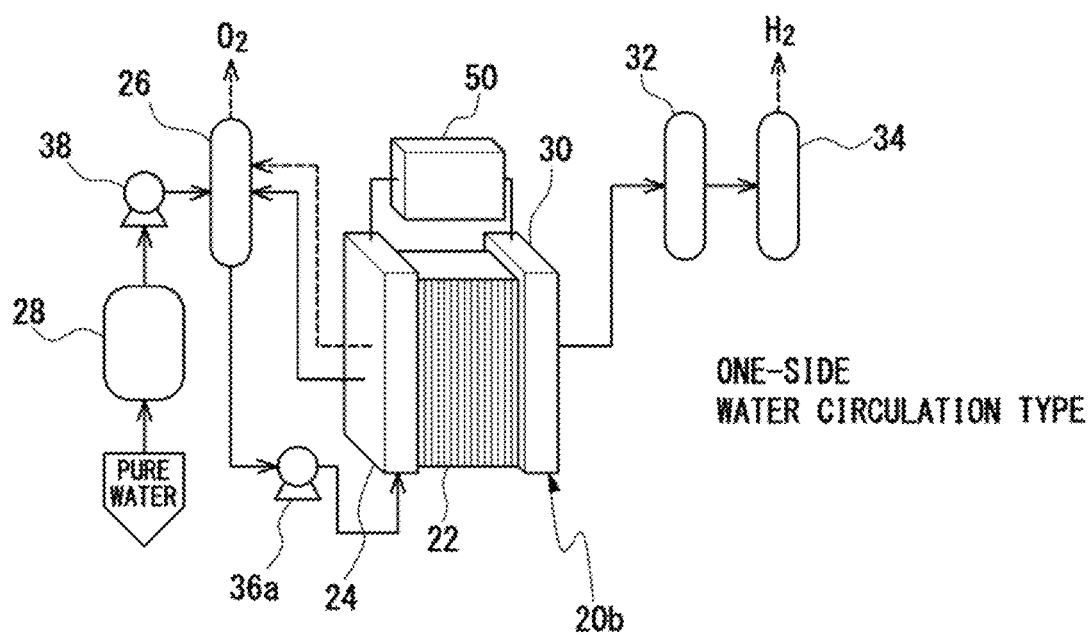
FIG. 3 is a schematic view of a one-side water circulation type electrolysis system.

FIG. 3 shows a schematic view of an electrolysis system of a second embodiment of the present invention. In FIG. 3, an electrolysis system 10b has:

a water electrolysis unit 20b equipped with a water electrolysis cell using a solid polymer electrolyte membrane as its diaphragm, a DC power source 50 for supplying the water electrolysis cell with a DC current, and a mitigation unit (not illustrated) for mitigating, when a counter electromotive force or abrupt potential fluctuation occurs in the water electrolysis cell, the counter electromotive force or the potential fluctuation.

In the electrolysis system 10b shown in FIG. 3, the water electrolysis unit 20b is a one-side water circulation type water electrolysis unit. It therefore does not have a circulation pump for delivering water stored in the hydrogen electrode-side gas-liquid separator 32 to a hydrogen electrode. This embodiment is different from the first embodiment in this point. In another point, these embodiments are similar to each other so that a description on other points is omitted.

3. Electrolysis System (3)

An electrolysis system of a third embodiment of the present invention has:

a water electrolysis unit equipped with a water electrolysis cell using a solid polymer electrolyte membrane as a diaphragm, a DC power source for supplying the water electrolysis cell with a DC current, a mitigation unit (not illustrated) for mitigating, when a counter electromotive force or abrupt potential fluctuation occurs in the water electrolysis cell, the counter electromotive force or the potential fluctuation, and a lowering rate controller for controlling the lowering rate of a current supplied from the DC power source to the water electrolysis cell.

3.1. Water Electrolysis Unit, DC Power Source, Mitigation Unit

Details of the water electrolysis unit, DC power source, and mitigation unit are similar to those of the first and second embodiments so that a description on them is omitted.

3.2. Lowering Rate Controller

3.2.1. Definition

The term "lowering rate controller" means a device for controlling, when supply of a DC current from the DC power source to the water electrolysis cell is stopped, the current such that a current lowering rate becomes a predetermined value or less.

The magnitude of a counter electromotive force generated when abrupt potential fluctuation occurs depends on the magnitude of a current before abrupt potential fluctuation occurs (in other words, depends on a current lowering rate at the time of sudden stop). In general, the larger a current before sudden stop (meaning that the larger the current lowering rate), the larger a counter electromotive force at the time of sudden stop. Even if the electrolysis system has the mitigation unit, therefore, deterioration of the water electrolysis cell progresses when the current lowering rate is excessively large.

On the other hand, when the electrolysis system has, in addition to the mitigation unit, a lowering rate controller, deterioration of the water electrolysis cell due to abrupt potential fluctuation can be suppressed even if a current before sudden stop is large.

3.2.2. Lowering Rate

The term "lowering rate" means a value obtained by dividing a change amount of a current ($\Delta I$) supplied from the DC power source by time ($\Delta t$) required for the change of the current.

For example, the lowering rate can be calculated as $\Delta I/\Delta t=-0.1$ A/msec when a current is lowered at $\Delta I=-0.1$ A and $\Delta t=1$ msec in a section from a start point ($I_s$) of the current to an endpoint ($I_e$) of the current and the current is retained for $t_k$ (sec) whenever it is lowered by $\Delta I$.

This means that in the case of stepwise lowering of a current, the lowering rate is calculated without considering the retention time $t_k$ (sec) at a predetermined current.

The normal electric potential of the water electrolysis unit is from 1.5 to 1.6 V. When the electric potential of the water electrolysis unit descends to 1.2 V, a fuel cell reaction occurs and the oxygen electrode catalyst is reduced. A permissible voltage drop (V) per cell is set at 1.5V−1.2V=0.3V.

A permissible current fluctuation rate is determined by 0.3×N/L [A/msec] where N represents the stacked number of the water electrolysis cells and L represents the inductance of a coil component from the end portion of the DC power source to the water electrolysis cell.

When the current lowering rate exceeds this permissible fluctuation rate, a relatively large counter electromotive force occurs. The lowering rate is therefore preferably 0.3×N/L [A/msec] or less.

An unnecessarily large decrease in the lowering rate, on the other hand, does not produce any profit because there is no difference in effect. An excessive decrease in the lowering rate leads to reduction in operation efficiency of the electrolysis system. The lowering rate is therefore preferably determined in consideration of these points.

When the current is lowered stepwise, oscillation of the current and voltage occurs just after lowering because of the presence of the coil component but the oscillation disappears soon. In the case of lowering the current stepwise, when the retention time $t_k$ (sec) is too short, next current lowering occurs before sufficient attenuation of the oscillation and a relatively large counter electromotive force may be generated. An unnecessarily long retention time $t_k$ (sec), on the other hand, does not produce any profit because there is no difference in effect.

The optimum retention time $t_k$ (sec) differs, depending on the magnitude of the coil component of the whole water electrolysis unit, the lowering rate, or the like. Usually, the oscillation substantially disappears by the retention for 0.2 seconds or more after the stepwise lowering of the current.

3.2.3. Specific Examples of Lowering Rate Controller

Any lowering rate controller can be used insofar as it can control the current of the water electrolysis cell at a predetermined lowering rate when the supply of the DC current from the DC power source to the water electrolysis cell is stopped.

For example, there is a commercially available DC power source equipped with a circuit that changes a current value at a controlled rate. Such a circuit of the DC power source can be used as is as the lowering rate controller. Parts having a function called "soft starter" may also be used (reference: https://www.de-denkosha.co.jp/p_p_sstarter.html).

The lowering rate controller may also be a mechanism having a function of temporarily storing electricity and then gradually releasing the stored electricity to control a current change such as cell, condenser, or capacitor.

4. Effect

When the oxygen electrode catalyst of a water electrolysis cell is exposed to a low potential, the surface of the oxygen electrode catalyst temporarily becomes reduced. The elution of the oxygen electrode catalyst progresses when the potential increases abruptly from such a state. Such elution of the oxygen electrode catalyst may occur in the case where a counter electromotive force occurs in the water electrolysis cell, potential fluctuation in input power occurs, or start/stop is repeated.

On the other hand, an electrolysis system equipped with a mitigation unit for mitigating a counter electromotive force or abrupt potential fluctuation can suppress elution of the oxygen electrode catalyst. The elution of the oxygen electrode catalyst is suppressed further when the electrolysis system is equipped further with the lowering rate controller.

EXAMPLES

Example 1, Comparative Examples 1 and 2)

1. Circuit

By using electrolysis systems having various circuits, influence of fluctuation in current density on the deterioration of their water electrolysis cell was studied. A unit cell having a cell area of 1 cm$^2$ was used as the water electrolysis cell. For the electrolysis systems, (a) a system having a DC power source and the water electrolysis cell simply connected to each other (Comparative Example 1), (b) a system having a coil (4 mH) connected between a DC power source and the water electrolysis cell (Comparative Example 2), and (c) a system having a coil (4 mH) and a diode connected in parallel between a DC power source and the water electrolysis cell (Example 1)

were used.

2. Test Method

2.1. Durability Test

A durability test was performed by carrying out a total of four cycles of fluctuation in current density, with the following steps (a) to (d) as one cycle.

(a) A current density was increased stepwise from 0 A/cm$^2$ to 6 A/cm$^2$. The step width of the current was set at 0.1 A/cm$^2$, and the step interval was set at 30 sec.

(b) When the current density reached 6 A/cm$^2$, the current density was lowered stepwise from 6 A/cm$^2$ to 3 A/cm$^2$ and retained at 3 A/cm$^2$ for 5 hours. A voltage change of the water electrolysis cell during retention was measured. The current lowering rate from 6 A/cm$^2$ to 3 A/cm$^2$ was set at −6 A/msec. The step interval ($t_k$) during current lowering was set at 5 sec.

(c) After completion of the retention, the current density was decreased once to 0 A/cm$^2$. The current lowering rate from 3 A/cm$^2$ to 0 A/cm$^2$ was set at −6 A/msec. The step interval ($t_k$) during current lowering was set at 5 sec. Continuously, the current density was increased stepwise from 0 A/cm$^2$ to 6 A/cm$^2$. The step width of the current was set at 0.1 A/cm$^2$, and the step interval was set at 30 sec.

(d) When the current density reached 6 A/cm$^2$, the current density was lowered stepwise to 0 A/cm$^2$. The system was left overnight in this state. The current lowering rate from 6 A/cm$^2$ to 0 A/cm$^2$ was set at −6 A/msec. The step interval ($t_k$) during current lowering was set at 5 sec.

2.2. Cell Voltage Behavior

After electrolysis at 3 [A/cm$^2$], the system was suddenly stopped. Time necessary for the current density to reach zero [A/cm$^2$] was about 20 msec. The behavior of the cell voltage at the time of sudden stop was measured using an oscilloscope.

3. Results

3.1. Durability Test

3.1.1. Comparative Example 1 (Only a Power Source)

Figure 4A:
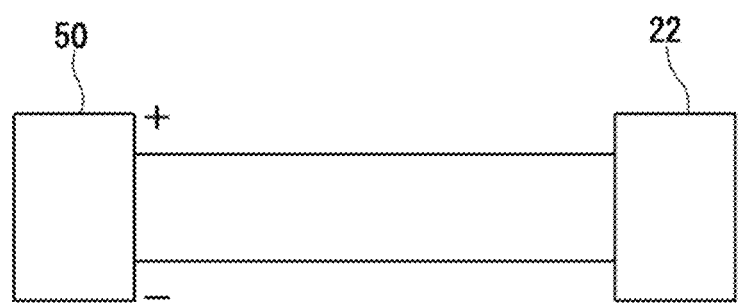
FIG. 4A is a circuit diagram of an electrolysis system of Comparative Example 1.
Figure 4B:
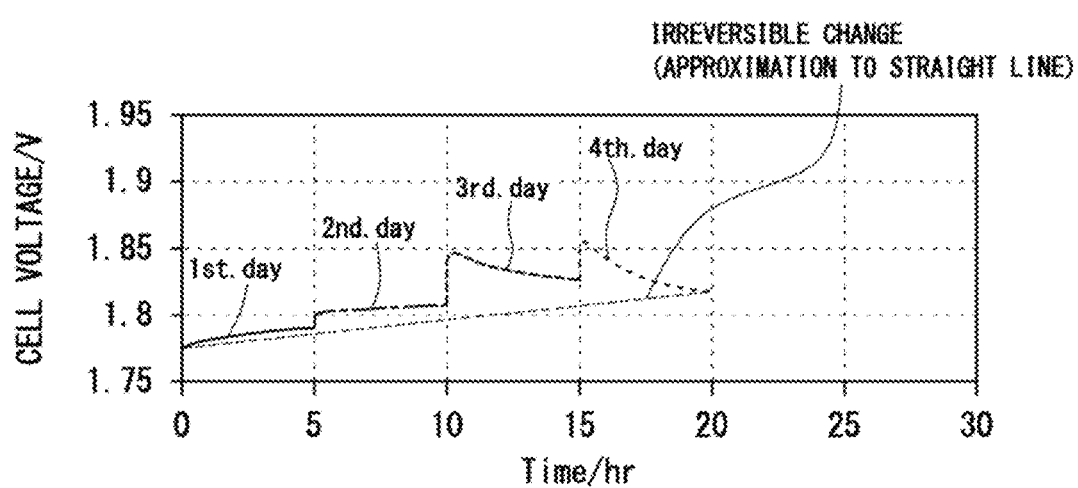
FIG. 4B is a time-dependent change of cell voltage when a current density is reduced abruptly.

FIG. 4A shows a circuit diagram of the electrolysis system of Comparative Example 1. FIG. 4B shows a time-dependent change of cell voltage during retention at 3 A/cm$^2$ when a current density is decreased abruptly (any of the following cases: 6 A/cm$^2$→3 A/cm$^2$, 3 A/cm$^2$→0 A/cm$^2$, and 6 A/cm$^2$→0 A/cm$^2$). In FIG. 4B, a broken line shows an irreversible change in cell voltage. The term "irreversible change" means a change in cell voltage that occurs when electrolysis is continued without causing abrupt current fluctuation.

In the electrolysis system of Comparative Example 1 equipped only with a power source, a change in cell voltage was substantially equal to the irreversible change until the second day (until retention at 3 A/cm² for 10 hours in total). On and after the third day, a large increase in cell voltage was observed.

A steep rise of the cell voltage was observed just after the current density was decreased from 6 A/cm² to 3 A/cm² (meaning after 5 hours, after 10 hours, and after 15 hours). This is because the oxygen electrode catalyst has been changed to an unstable state which is likely to elute before and during leaving overnight, so that elution of the catalyst progresses drastically when continuous operation is then started at 3 A/cm², and temporary deterioration in the performance of the catalyst occurs. Thereafter, an increase in voltage was observed while operation was continued at 3 A/cm². This is presumably because elution of the catalyst still continues or the catalyst performance on the surface of the catalyst changes to deterioration.

On the other hand, a decrease in voltage was observed during operation at 3 A/cm². This is presumably because, due to a large elution amount of the catalyst in the previous procedure, a re-precipitation amount of the catalyst component once eluted on the surface of the catalyst is large.

3.1.2. Comparative Example 2 (Only a Coil)

Figure 5A:
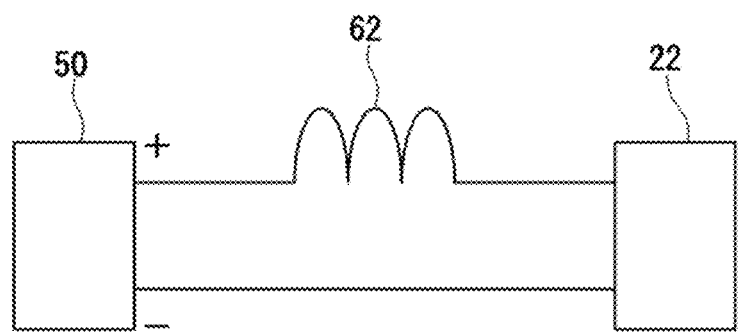
FIG. 5A is a circuit diagram of an electrolysis system of Comparative Example 2.
Figure 5B:
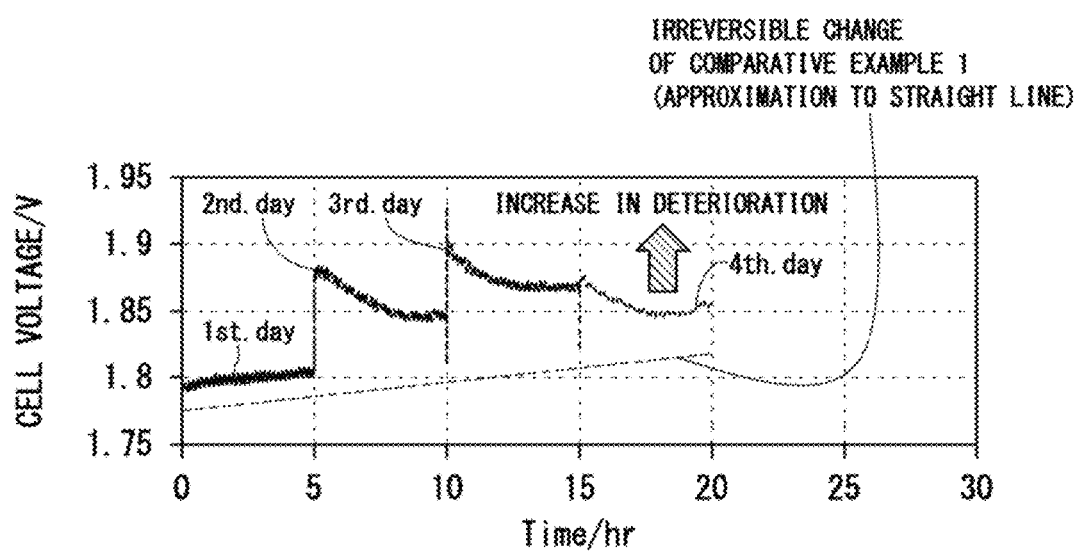
FIG. 5B is a time-dependent change of cell voltage when a current density is reduced abruptly.

FIG. 5A shows a circuit diagram of the electrolysis system of Comparative Example 2. FIG. 5B shows a time-dependent change of cell voltage during retention at 3 A/cm² when the current density is decreased abruptly (any of the following cases: 6 A/cm²→3 A/cm², 3 A/cm²→0 A/cm², and 6 A/cm²→0 A/cm²).

The electrolysis system of Comparative Example 2 having a coil inserted therein was deteriorated more than that of Comparative Example 1. In addition, not only the reversible change component but also the irreversible change component increased. This is presumably because at the time of an abrupt drop of the current, the coil generates a backward current and accelerates deterioration.

3.1.3. Example 1 (Coil+Diode)

Figure 6A:
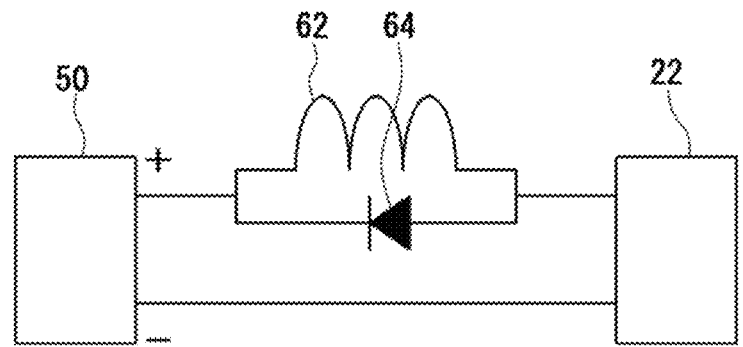
FIG. 6A is a circuit diagram of an electrolysis system of Example 1.
Figure 6B:
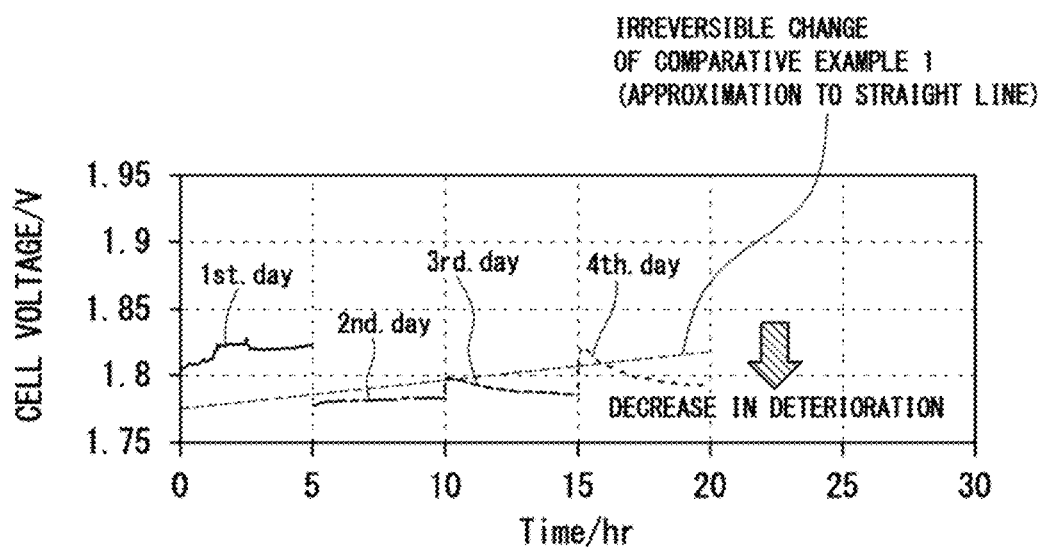
FIG. 6B is a time-dependent change of cell voltage when a current density is reduced abruptly.

FIG. 6A shows a circuit diagram of the electrolysis system of Example 1. FIG. 6B shows a time-dependent change of cell voltage during retention at 3 A/cm² when the current density is decreased abruptly (any of the following cases: 6 A/cm²→3 A/cm², 3 A/cm²→0 A/cm², and 6 A/cm²→0 A/cm²).

When a coil and a diode were connected in parallel, deterioration slowed down compared with the deterioration in Comparative Example 1. Not only a reversible change component but also an irreversible change component decreased. This is presumably because when the coil and diode are connected in parallel, a high-frequency component coming from the DC power source is filtered and at the same time a backward current generated by the coil is consumed at the diode.

3.2. Cell Voltage Behavior

FIG. 7A shows a time-dependent change of cell voltage before and after sudden stop of a current (−0.1 second to +0.5 second) in an electrolysis systems equipped with various circuits. FIG. 7B shows a partially enlarged view of FIG. 7A (−0.05 second to +0.15 second). The following can be seen from FIGS. 7A and 7B.

(1) In Comparative Example 1 (only a cell), oscillation of the cell voltage was not observed after sudden stop. A voltage change rate just after sudden stop was the largest in Comparative Example 1. An abrupt voltage change just after sudden stop is presumed to be a cause of a large irreversible change.

(2) In Comparative Example 2 (only a coil), oscillation of the cell voltage was observed after sudden stop. The amplitude of the oscillation of the cell voltage was larger than that in Example 1. This large amplitude is presumed to be a cause of a large irreversible change.

(3) In Example 1 (a coil+a diode), a voltage change rate just after sudden stop was smaller than that in Comparative Example 1. In addition, the amplitude of the cell voltage after sudden stop was smaller than that in Comparative Example 2.

Examples 2 to 5

1. Circuit

An electrolysis system having, between the DC power source and the water electrolysis cell thereof, a coil (4 mH) and a diode connected in parallel was used. As the DC power source, one equipped with a lowering rate controller was used. As the water electrolysis cell, a unit cell (N=1) having a cell area of 1 cm² was used. Further, the inductance L of the coil component from the end portion of the DC power source to the water electrolysis cell was 4 mH and that of a portion other than the coil was less than 1 mH.

2. Test Method

A durability test was performed by carrying out a total of five or four cycles of fluctuation in current density, with the following steps (a) to (d) as one cycle.

(a) A current density was increased stepwise from 0 A/cm² to 6 A/cm². The step width of the current was set at 0.1 A/cm², and the step interval was set at 30 sec.

(b) When the current density reached 6 A/cm², the current density was lowered stepwise from 6 A/cm² to 3 A/cm² and retained at 3 A/cm² for 5 hours. A voltage change of the water electrolysis cell during retention was measured. The current lowering rate from 6 A/cm² to 3 A/cm² was set at −0.1 A/msec (Example 2), −0.5 A/msec (Example 3), −1.0 A/msec (Example 4), or −6 A/msec (Example 5). The step interval ($t_k$) during current lowering was set at 5 sec.

(c) After completion of the retention, the current density was decreased once to 0 A/cm². The current lowering rate from 3 A/cm² to 0 A/cm² was set at −0.1 A/msec (Example 2), −0.5 A/msec (Example 3), −1.0 A/msec (Example 4), or −6 A/msec (Example 5). The step interval ($t_k$) during current lowering was set at 5 sec. Continuously, the current density was increased stepwise from 0 A/cm² to 6 A/cm². The step width of the current was set at 0.1 A/cm², and the step interval was set at 30 sec.

(d) When the current density reached 6 A/cm², the current density was lowered stepwise to 0 A/cm². The system was left overnight in this state. The current lowering rate from 6 A/cm² to 0 A/cm² was set at −0.1 A/msec (Example 2), −0.5 A/msec (Example 3), −1.0 A/msec (Example 4), or −6 A/msec (Example 5). The step interval ($t_k$) during current lowering was set at 5 sec.

3. Results

3.1. Time-Dependent Change in Cell Voltage

Figure 8A:
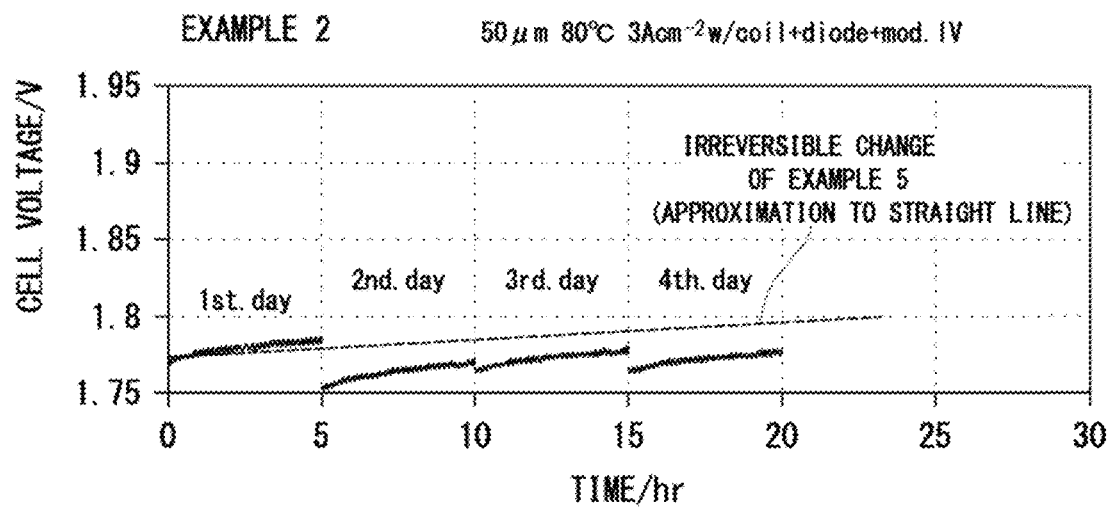
FIG. 8A is a time-dependent change of cell voltage when a current is lowered at −0.1 A/msec (Example 2) in an electrolysis system equipped with a mitigation unit.
Figure 8B:
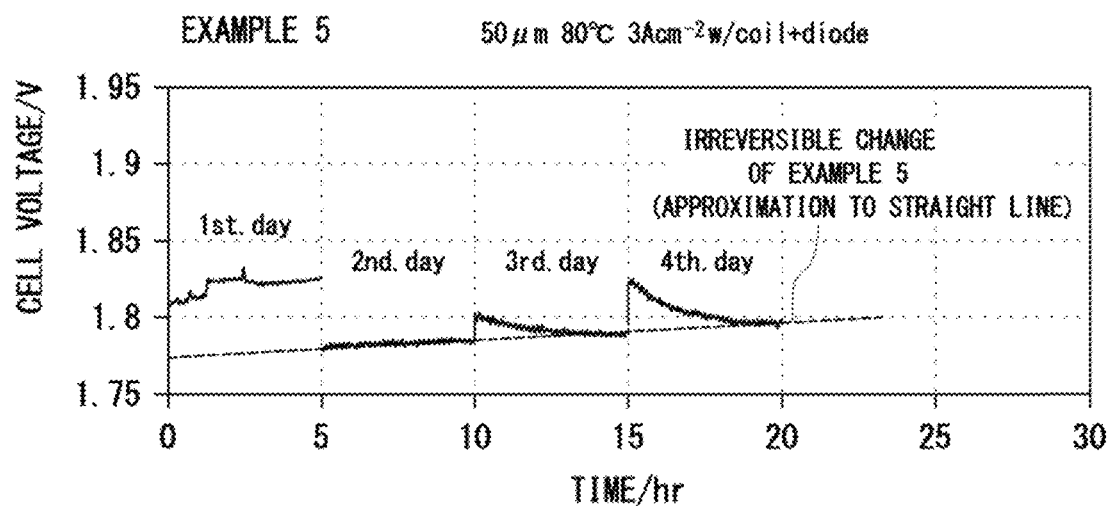
FIG. 8B is a time-dependent change of cell voltage when a current is lowered at −6 A/msec (Example 5) in an electrolysis system equipped with a mitigation unit.

FIG. 8A shows a time-dependent change of cell voltage when a current is lowered at −0.1 A/msec (Example 2) in the electrolysis system equipped with a mitigation unit. FIG. 8B shows a time-dependent change of cell voltage when a current is lowered at −6 A/msec (Example 5) in the electrolysis system equipped with a mitigation unit. The following can be seen from FIGS. 8A and 8B.

(1) In Example 5, a durability test was performed under conditions similar to those in Example 1. An irreversible change in Example 5 was smaller than that in Comparative Example 1.

(2) A change in cell voltage in Example 2 became smaller than an irreversible change in Example 5. This is presumably because the elution of the oxygen electrode catalyst is suppressed by the retardation of the current lowering rate.

3.2. Time-Dependent Change in Membrane Resistance

FIGS. 9A, 9B, 9C, and 9D show respective time-dependent changes of membrane resistance when a current is lowered at various lowering rates in the electrolysis systems equipped with the mitigation unit. From the standpoint of suppression of elution of the catalyst, the membrane resistance concurrently measured with the cell voltage represents information more directly than the cell voltage. The following can be seen from FIGS. 9A, 9B, 9C, and 9D.

(1) In Example 2, the resistance was slightly high for initial 5 hours because running-in operation was insufficient, but it lowered and became stable after that.

(2) In Examples other than Example 2, the resistance for initial 5 hours was lower than that after 5 hours, though running-in operation was insufficient.

(3) This means that in Examples other than Example 2, the membrane resistance tends to show a gradual increase.

3.3. Change Rate in Membrane Resistance

When the current density was retained at 3 A/cm$^2$, the resistance was high just after the retention was started and it gradually decreased with the passage of time. Only resistance values ($R_{Ini}$) just after the retention at 3 A/cm$^2$ was started were extracted and an approximate straight line of them was drawn. The inclination ($\Delta R_{Ini}$/hr) of the line was then determined. Similarly, only resistance values ($R_{Fin}$) when the retention at 3 A/cm$^2$ was finished were extracted and an approximate straight line of them was drawn. The inclination ($\Delta R_{Fin}$/hr) of the line was then determined.

Figure 10A:
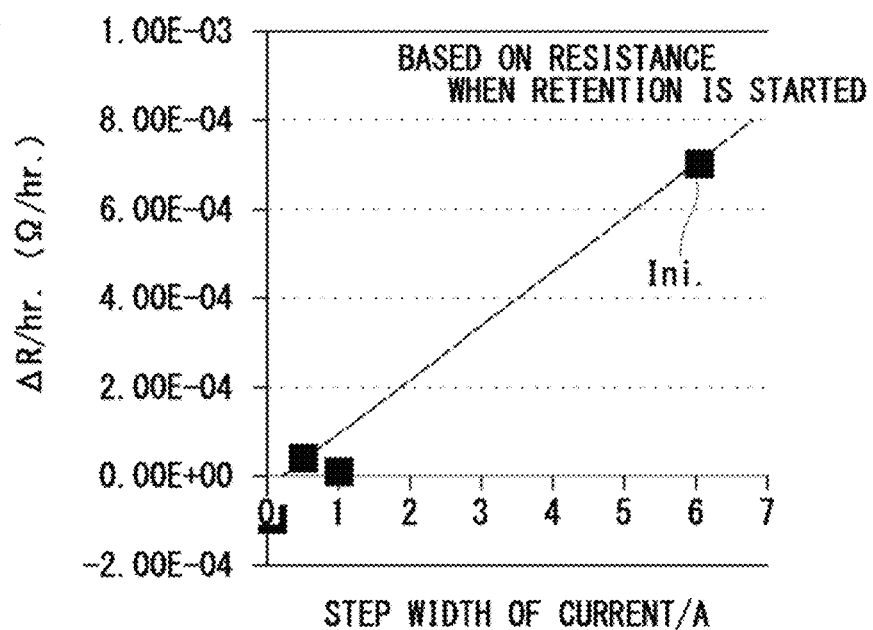
FIG. 10A is the relation between a step width ($\Delta I$) of a current and a change rate ($\Delta R_{Ini.}/hr$) of membrane resistance, calculated from the membrane resistance ($R_{Ini.}$) just after retention at 3 A/cm$^2$ is started.
Figure 10B:
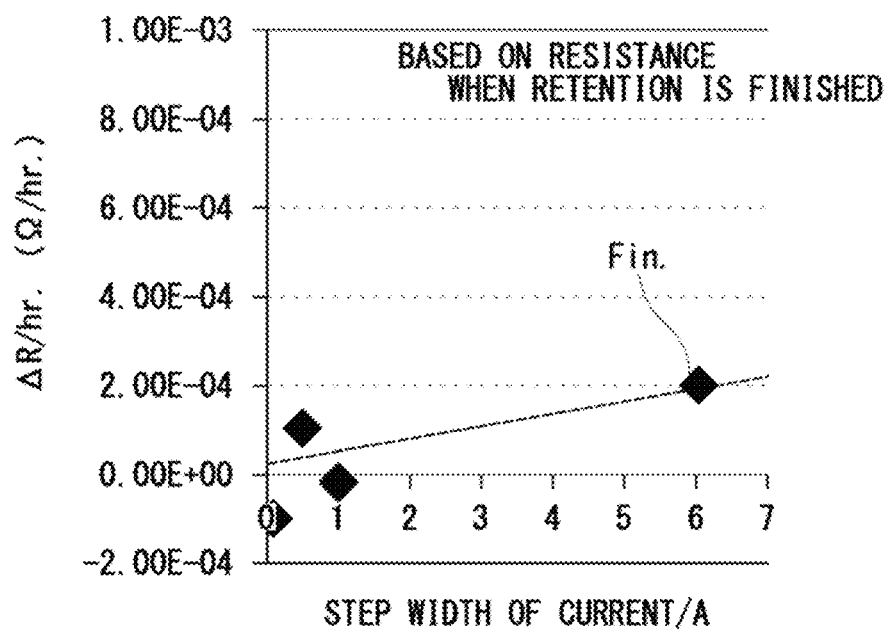
FIG. 10B is the relation between a step width ($\Delta I$) of a current and a change rate ($\Delta R_{Fin.}/hr$) of membrane resistance, calculated from the membrane resistance ($R_{Fin.}$) at the time when retention at 3 A/cm$^2$ for 5 hours is finished.

FIG. 10A shows the relation between the step width ($\Delta I$) of the current and a change rate ($\Delta R_{Ini}$/hr) of the membrane resistance, calculated from the membrane resistance ($R_{Ini}$) just after the retention at 3 A/cm$^2$ is started. FIG. 10B shows the relation between the step width ($\Delta I$) of the current and a change rate ($\Delta R_{Fin}$/hr) of the membrane resistance, calculated from the membrane resistance ($R_{Fni}$) at the time when the retention at 3 A/cm$^2$ for 5 hours is finished. The following can be seen from FIGS. 10A and 10B.

(1) Both $\Delta R_{Ini}$/hr and $\Delta R_{Fin}$/hr increased with an increase in the step width ($\Delta I$) of the current.

(2) In order to reduce a change rate ($\Delta R$/hr) of the membrane resistance, it is preferred to adjust the step width ($\Delta I$) of the current to 1.0 A or less.

Example 6

1. Circuit

An electrolysis system having, between the DC power source and the water electrolysis cell thereof, a coil (4 mH) and a diode connected in parallel was used. As the DC power source, one equipped with a lowering rate controller was used. As the water electrolysis cell, a unit cell (N=1) having a cell area of 1 cm$^2$ was used. Further, the inductance L of the coil component from the end portion of the DC power source to the water electrolysis cell was 4 mH and that of a portion other than the coil was less than 1 mH.

2. Test Method

After electrolysis at a predetermined current X [A], the system was stopped suddenly. The current X [A] was set at 6, 5, 4, 3, 2, 1, 0.5, or 0.1. The time required for the current to reach zero [A] from X [A] was set at about 20 msec irrespective of the value of the current X [A]. The current and voltage behaviors at the time of sudden stop were measured using an oscilloscope.

3. Results

3.1. Oscillation of Current and Voltage

FIG. 11A shows a time-dependent current change when the current supplied from the DC power source is abruptly lowered from 6 A to zero A. FIG. 11B shows a time-dependent change of cell voltage when the current supplied from the DC power source is abruptly lowered from 6 A to zero A. The following can be seen from FIGS. 11A and 11B.

(1) After the current supplied from the DC power source was blocked, oscillation of the current and voltage continued for a while. This owes to a counter electromotive force generated by the coil component of the water electrolysis unit and repetition of transfer of electricity between this coil component and the capacitance component of the system.

(2) Oscillation of the current and voltage disappeared after about 0.2 seconds. This suggests that in the case of lowering the current stepwise by the pitch of $\Delta I$, it may proceed to the next step after retention for about 0.2 seconds.

3.2. Peak Voltage Value

Figure 12A:
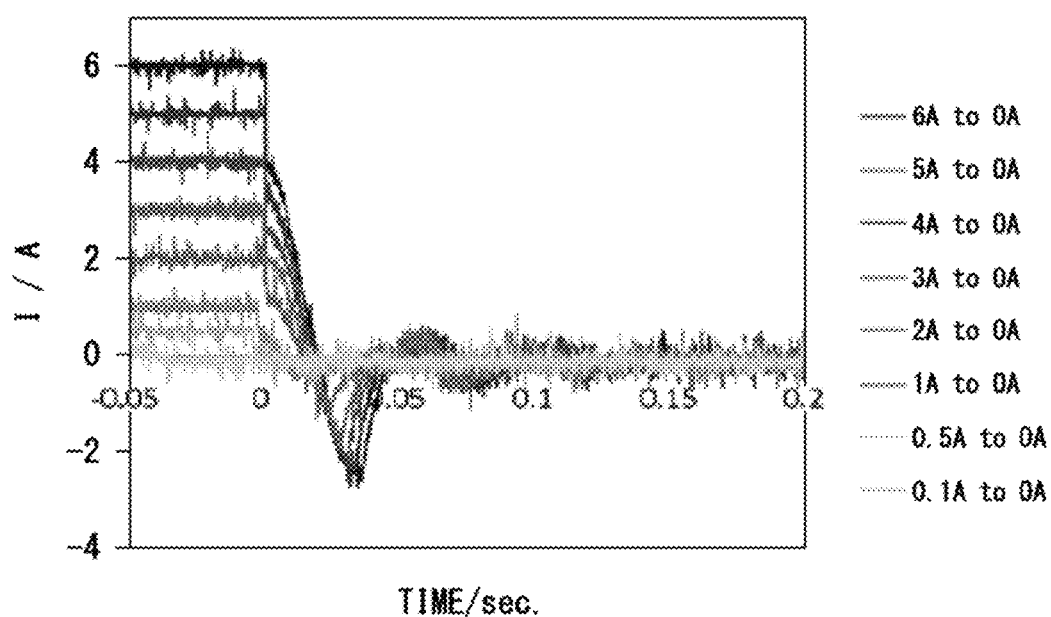
FIG. 12A is a time-dependent current change when a current supplied from the DC power source is abruptly lowered from X [A] to zero [A]
Figure 12B:
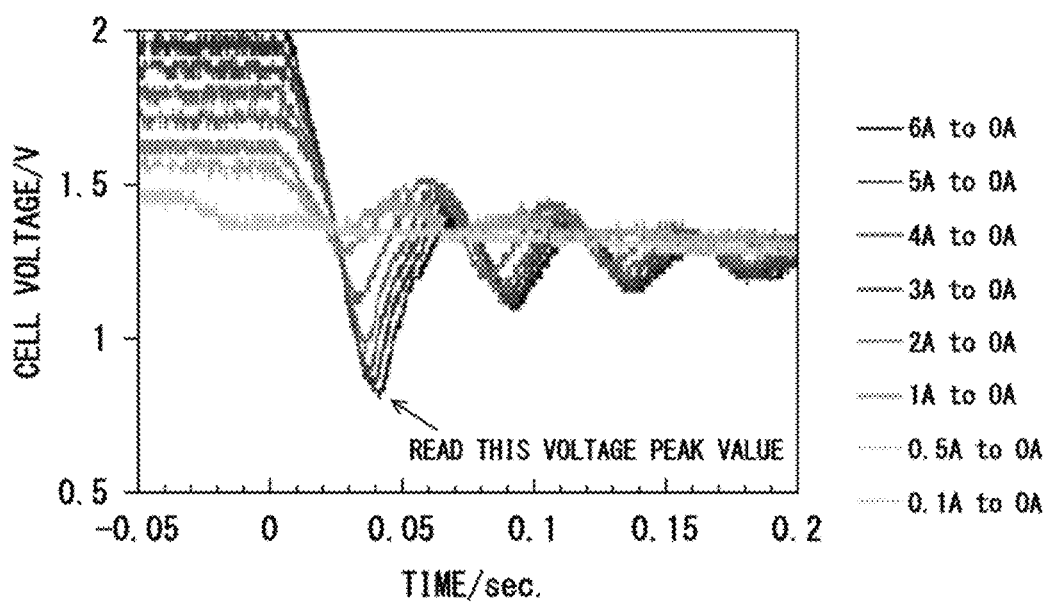
FIG. 12B is a time-dependent change of cell voltage when a current supplied from the DC power source is abruptly lowered from X [A] to zero [A]

FIG. 12A shows a time-dependent current change when the current supplied from the DC power source is abruptly lowered from X [A] to zero [A]. FIG. 12B shows a time-dependent change of cell voltage when the current supplied from the DC power source is abruptly lowered from X [A] to zero [A]. FIGS. 12A and 12B suggest that the larger the current before sudden stop, the smaller the minimum voltage (peak voltage) just after sudden stop (that is, the larger the amplitude). This occurs because since the current is lowered uniformly at 20 msec from X [A] to zero [A], the current lowering rate increases with an increase in X.

Figure 13A:
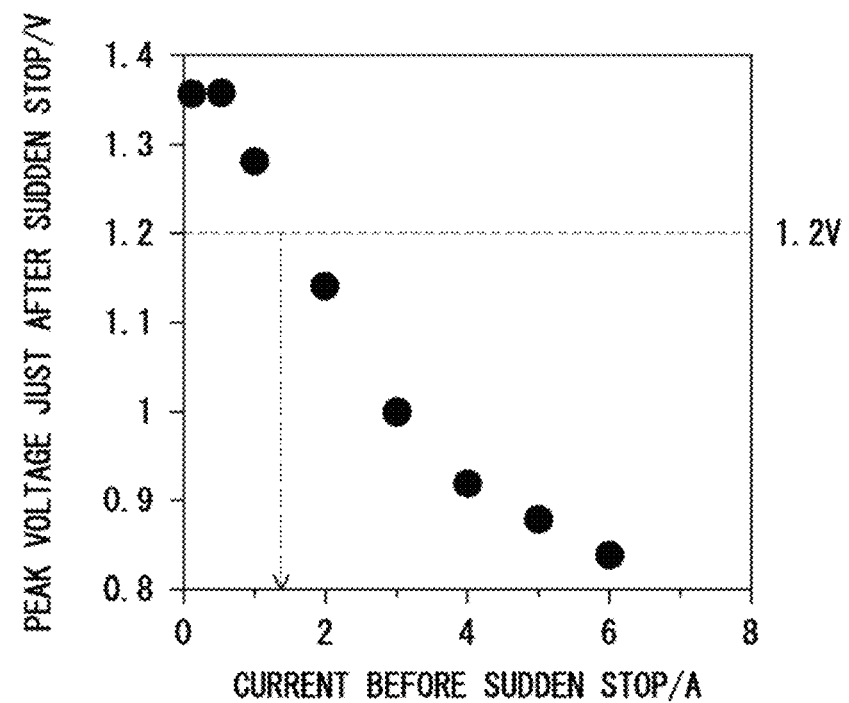
FIG. 13A is the relation between a current before sudden stop and a peak voltage just after the sudden stop.
Figure 13B:
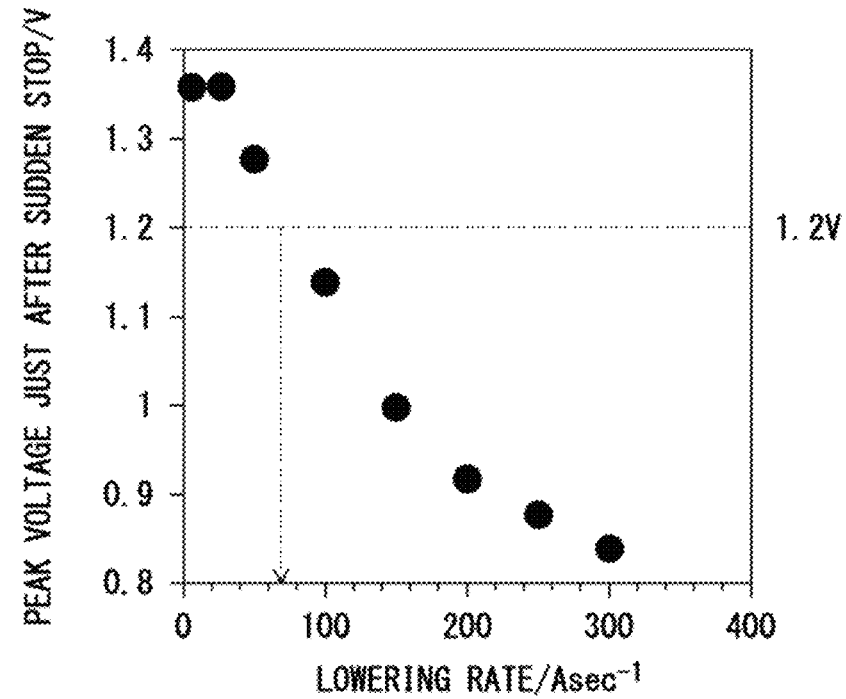
FIG. 13B is the relation between a lowering rate at the time of sudden stop and a peak voltage just after the sudden stop.

FIG. 13A shows the relation between the current before sudden stop and the peak voltage just after sudden stop. FIG. 13B shows the relation between the lowering rate at the time of sudden stop and the peak voltage just after sudden stop. The following can be seen from FIGS. 13A and 13B.

(1) A fuel cell reaction and reduction of the oxygen electrode catalyst occur at a cell voltage of 1.2 V or less. In order to keep the cell voltage at 1.2 V or more even after sudden stop, the current before sudden stop is preferably adjusted to 1.5 A or less.

(2) In order to keep the cell voltage at 1.2 V or more even after sudden stop, the lowering rate is preferably adjusted to 75 [A/sec] or less.

The embodiments of the present invention have been described in detail. The invention is, however, not limited to these embodiments but can be modified in various ways without departing from the gist of the present invention.

The electrolysis system of the present invention can be used as a hydrogen source installed in a hydrogen station for supplying fuel-cell vehicles with hydrogen.

What is claimed is:

1. An electrolysis system, comprising:
   a water electrolysis unit having a water electrolysis cell using a solid polymer electrolyte membrane as a diaphragm,
   a DC power source for supplying the water electrolysis cell with a DC current, and
   a mitigation unit for mitigating, when a counter electromotive force or abrupt potential fluctuation occurs in the water electrolysis cell, the counter electromotive force or the potential fluctuation, wherein
   the DC power source, the mitigation unit, and the water electrolysis unit are connected in series in this order.

2. The electrolysis system according to claim 1, wherein
   the mitigation unit has a coil connected between the DC power source and the water electrolysis cell and a diode (A) connected in parallel with the coil; and
   the diode (A) is connected in parallel with the coil so that a direction opposite to a current direction for electrolysis becomes a forward direction.

3. The electrolysis system according to claim 2, further comprising
   an AC resistance meter connected with the water electrolysis cell.

4. The electrolysis system according to claim 1, wherein
   the mitigation unit has a diode (B) connected between the DC power source and the water electrolysis cell, and
   the diode (B) is connected between the DC power source and the water electrolysis cell so that a current direction for electrolysis becomes a forward direction.

5. The electrolysis system according to claim 1, further comprising
   a lowering rate controller for controlling a lowering rate of a current supplied from the DC power source to the water electrolysis cell, wherein
   the lowering rate controller controls, when supply of the DC current from the DC power source to the water electrolysis cell is stopped, the current so that the lowering rate becomes 0.3×N/L [A/msec] or less,
   where N represents the stacked number of the water electrolysis cell, and
   L represents an inductance of a coil component from an end portion of the DC power source to the water electrolysis cell.

6. The electrolysis system according to claim 1, wherein
   the DC power source is a variable power source having a solar power generator, a wind power generator, and/or a wave power generator.

7. The electrolysis system according to claim 1 for use in electrolysis at a high current density of 1.5 A/cm$^2$ or more.

8. The electrolysis system according to claim 1, wherein
   one end of the mitigation unit is directly connected to one of two terminals of the DC power source, and another end of the mitigation unit is directly connected to one side of the water electrolysis unit.

9. The electrolysis system according to claim 1, wherein
   the mitigation unit is provided directly between one of two terminals of the DC power source and one side of the water electrolysis unit, and
   another of the two terminals of the DC power source is directly connected to another side of the water electrolysis unit.

* * * * *